US010325336B2

(12) United States Patent
Kotake et al.

(10) Patent No.: US 10,325,336 B2
(45) Date of Patent: Jun. 18, 2019

(54) INFORMATION PROCESSING APPARATUS, INFORMATION PROCESSING METHOD, AND PROGRAM

(71) Applicant: CANON KABUSHIKI KAISHA, Tokyo (JP)

(72) Inventors: Daisuke Kotake, Yokohama (JP); Masakazu Fujiki, Kawasaki (JP); Keisuke Tateno, Munich (DE)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 15/529,438

(22) PCT Filed: Nov. 9, 2015

(86) PCT No.: PCT/JP2015/005596
§ 371 (c)(1),
(2) Date: May 24, 2017

(87) PCT Pub. No.: WO2016/084316
PCT Pub. Date: Jun. 2, 2016

(65) Prior Publication Data
US 2017/0358048 A1 Dec. 14, 2017

(30) Foreign Application Priority Data

Nov. 28, 2014 (JP) .................................. 2014-242439
Sep. 11, 2015 (JP) .................................. 2015-179096

(51) Int. Cl.
*G06T 1/00* (2006.01)
*G06T 7/73* (2017.01)

(52) U.S. Cl.
CPC .............. *G06T 1/0007* (2013.01); *G06T 7/75* (2017.01); *G06T 2219/2004* (2013.01)

(58) Field of Classification Search
CPC . G06T 1/0007; G06T 7/75; G06T 2219/2004; G06T 2207/30244; G06T 2207/10004; G06T 2207/10028
See application file for complete search history.

(56) References Cited

U.S. PATENT DOCUMENTS 6,980,690 B1 * 12/2005 Taylor ................. G06F 3/04845
345/419
8,401,276 B1 * 3/2013 Choe ...................... G01C 11/06
345/419

(Continued)

FOREIGN PATENT DOCUMENTS

JP 2011-027623 A 2/2011
JP 2014-160405 A 9/2014

OTHER PUBLICATIONS

Kemmotsu, Keiichi, Kanade, Takeo, Sensor Placement Design for Object Pose Determination with Three Light-Stripe Range Finders, Proceedings of the 1994 IEEE International Conference on Robotics and Automation, vol. 2 , 1994, pp. 1357-1364. (Year: 1994).*

(Continued)

*Primary Examiner* — Ali Bayat
(74) *Attorney, Agent, or Firm* — Canon U.S.A., Inc. IP Division

(57) ABSTRACT

An information processing apparatus for determining a placement of an image capturing apparatus capable of accurately measuring the position and orientation of an object through model fitting includes a holding unit that holds a 3D model representing a 3D shape of the object, a generating unit that generates candidates of the position and orientation of the image capturing apparatus relative to the object, an evaluating unit that evaluates the candidates of the position and orientation of the image capturing apparatus relative to the object based on a result of matching between data that virtually generates the object observed when the (Continued)

image capturing apparatus is placed in the position and orientation generated by the generating unit and the 3D model, and a determining unit that determines the position and orientation of the image capturing apparatus relative to the object based on the result of evaluation performed by the evaluating unit.

13 Claims, 5 Drawing Sheets

(56) References Cited

U.S. PATENT DOCUMENTS

| | | | |
|---|---|---|---|
| 10,025,886 B1* | 7/2018 | Rublee | G06F 17/50 |
| 2012/0224069 A1* | 9/2012 | Aoki | G01B 11/026 |
| | | | 348/187 |
| 2014/0270362 A1* | 9/2014 | Najafi Shoushtari | |
| | | | G06K 9/6204 |
| | | | 382/103 |
| 2015/0055085 A1* | 2/2015 | Fonte | G06Q 30/0621 |
| | | | 351/178 |

OTHER PUBLICATIONS

Keiichi Kemmotsu and Takeo Kanade, Sensor Placement Design for Object Pose Determination with Three Light-Stripe Range Finders, Proceedings of the 1994 IEEE International Conference on Robotics and Automation, vol. 2, 1994, pp. 1357-1364.

Radu Horaud and Fadi Dornaika, Hand-Eye Calibration, International Journal of Robotics Research, vol. 14, No. 3, pp. 195-210, 1995.

Zhengyou Zhang, A Flexible New Technique for Camera Calibration, IEEE Transactions on Pattern Analysis and Machine Intelligence, vol. 22, No. 11, pp. 1330-1334, 2000.

Tom Drummond, Real-Time Visual Tracking of Complex Structures, IEEE Transactions on Pattern Analysis and Machine Intelligence, vol. 24, No. 7, pp. 932-946, 2002.

William Hoff and Tyrone Vincent, Analysis of Head Pose Accuracy in Augmented Reality, IEEE Transactions on Visualization and Computer Graphics, vol. 6, No. 4, pp. 319-334, 2000.

* cited by examiner

[Fig. 1]
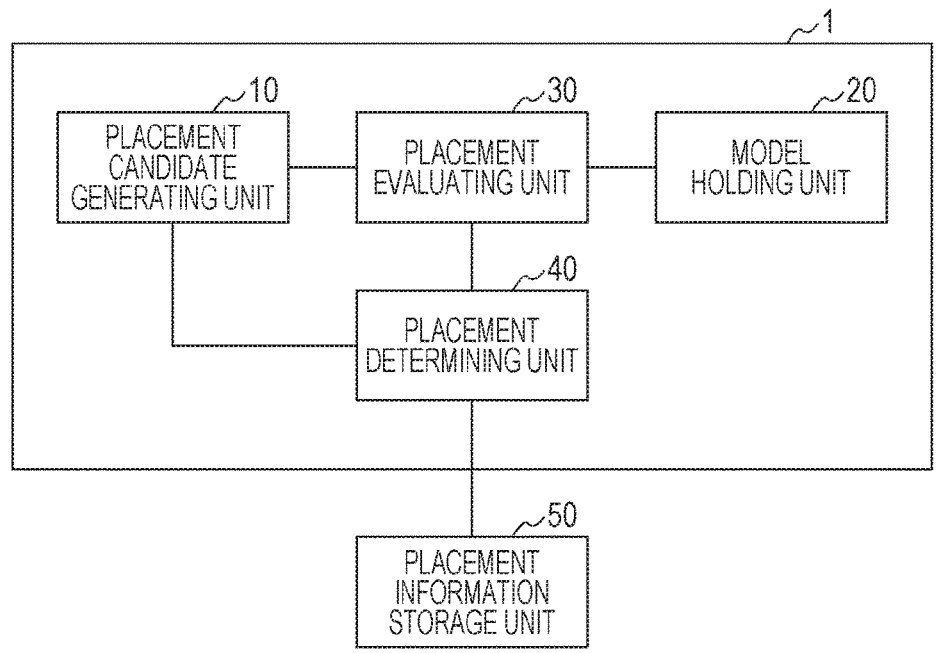
[Fig. 2]
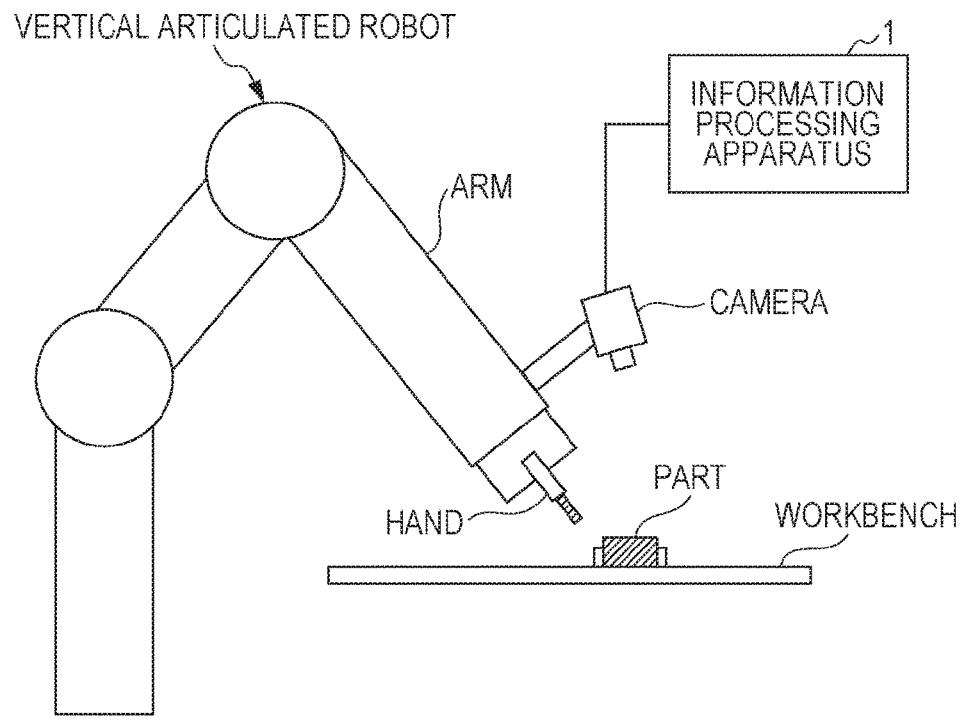

[Fig. 3]
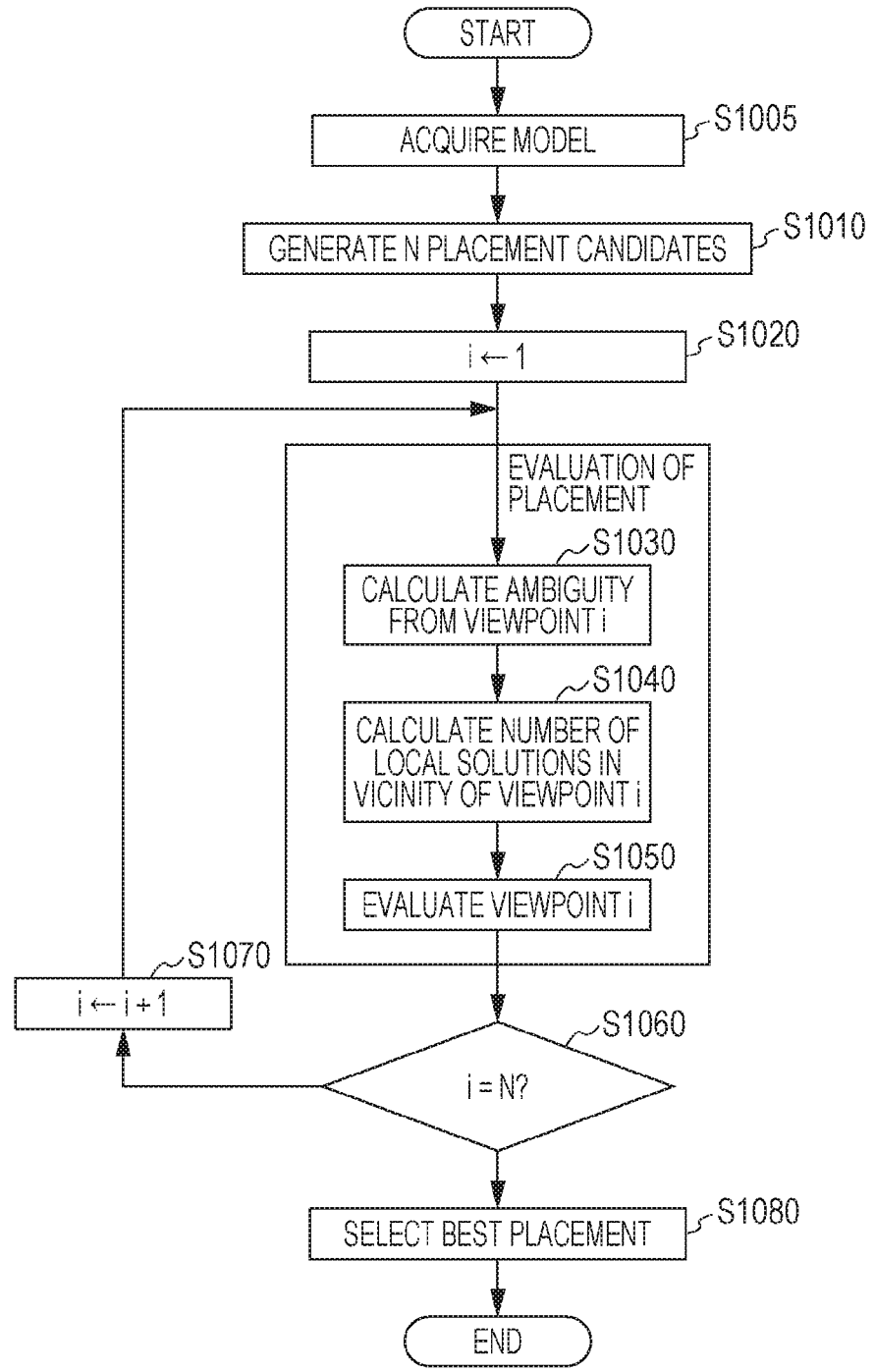

[Fig. 4]
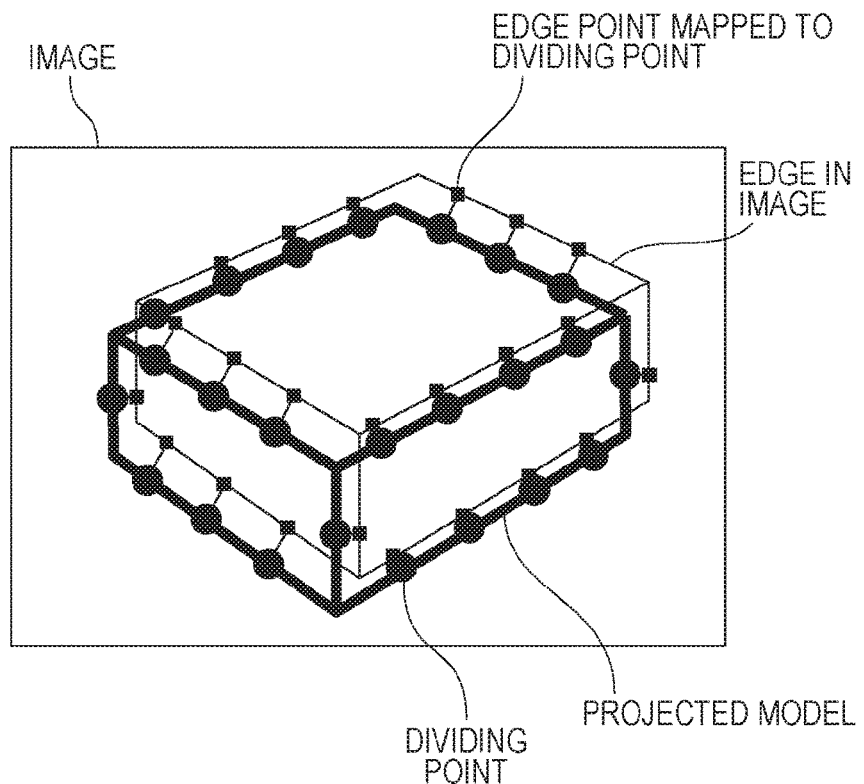
[Fig. 5]
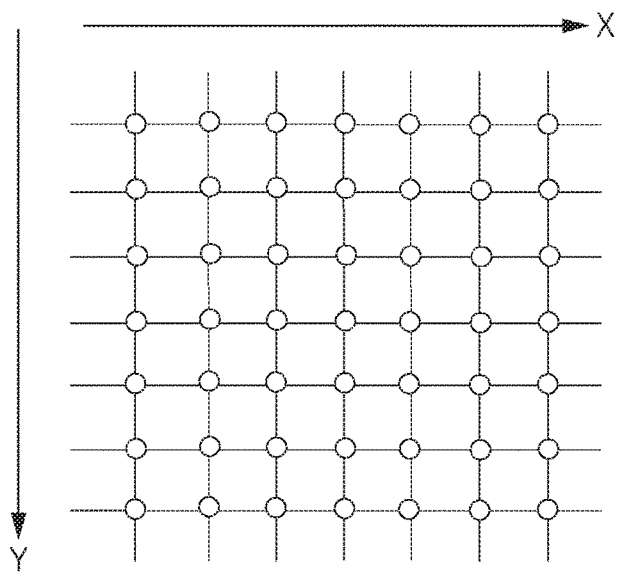

[Fig. 6]
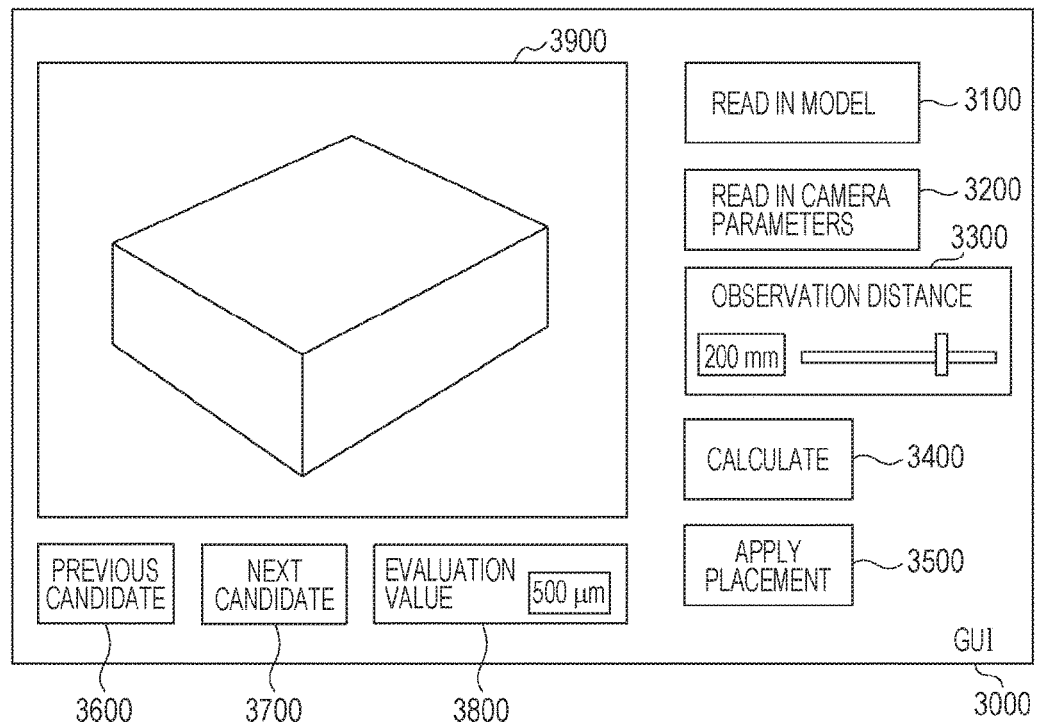
[Fig. 7]
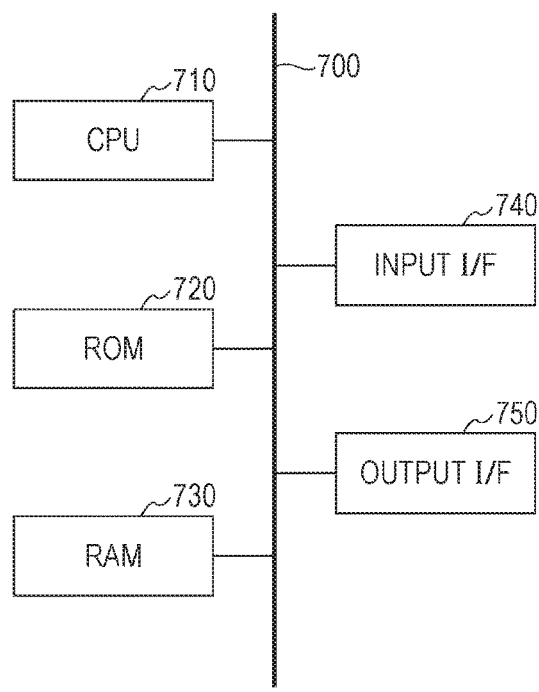

[Fig. 8]
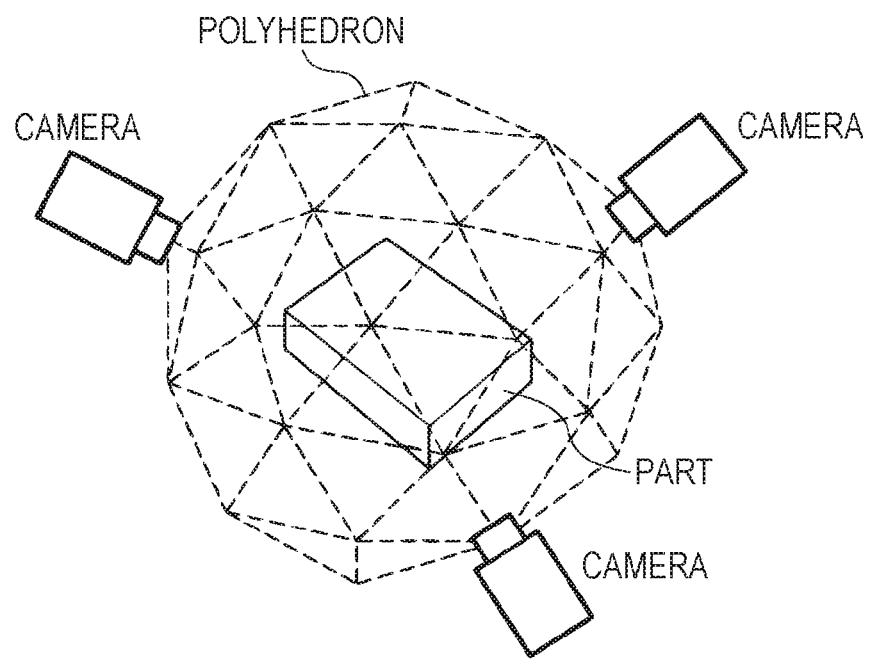

INFORMATION PROCESSING APPARATUS, INFORMATION PROCESSING METHOD, AND PROGRAM

TECHNICAL FIELD

The present invention relates to a method for determining the placement of a measuring device for accurately measuring the position and orientation of an object to be measured.

BACKGROUND ART

In recent years, with the evolution of robotics technologies, robots have increasingly taken the place of humans in achieving complicated tasks that humans typically perform, such as assembling of industrial products. To grasp a part and assemble parts together to manufacture an industrial product using a robot, the position and orientation of each of the parts from the view point of the robot need to be accurately measured. To measure the position and orientation of each of the parts, a method called model fitting is typically employed. In model fitting, the position and orientation is calculated so that the three-dimensional (3D) shape model of the part fits the grayscale image obtained from a camera or the range image obtained from a range sensor. More specifically, the image feature detected from the grayscale image or 3D point cloud obtained from the range image are matched to the model feature and, thereafter, the position and orientation is calculated so that the sum of errors between the matched features in the image plane or the 3D space is minimized.

When the position and orientation of a part is measured using model fitting to the grayscale image or the range image, the placement of a camera and a range sensor relative to the part is an important factor because it greatly affects the measurement accuracy of the position and orientation. Accordingly, the camera or the range sensor needs to be placed so that the measurement accuracy is maximized. For example, if a range sensor is used, the range sensor is placed so that a point in each of three planes having different normal vectors is sufficiently observed. In this manner, the position and orientation of the part can be accurately measured. NPL 1 describes a method for selecting the optimum placement from among a plurality of candidates of placement of the range sensors by estimating the uncertainty (the error) of the position and orientation of an object to be measured on the basis of the uncertainty included in measurement data obtained from the range sensor.

In NPL 1, it is assumed that no error occurs in matching between the measured data and the 3D shape model and, thus, an error in the position and orientation obtained through model fitting is caused by only an error in the measurement data. However, since in reality, an error occurs in matching between the measurement data and the 3D shape model, the accuracy of the measured position and orientation is lower than in the case in which only the measurement data has an error. For example, when the 3D shape model (the line segment based model) of an object is applied to edges detected from a grayscale image and if a plurality of the edges are in close proximity to one another in the image, a line segment of the model may be matched to a wrong edge. In such a case, the accuracy of the position and orientation significantly decreases. Consequently, even when the placement of the camera or the range sensor is determined on the basis of the method described in NPL 1, the measured position and orientation is not always accurate if the matching has an error.

CITATION LIST

Patent Literature

PTL 1: Japanese Patent Laid-Open No. 2011-027623

Non Patent Literature

NPL 1: K. Kemmotsu and T. Kanade. "Sensor Placement Design for Object Pose Determination with Three Light-Stripe Range Finders." Journal of The Institute of Electronics, Information and Communication Engineers, vol. J78-D2, no. 12, pp. 1777-1786, 1995

NPL 2: R. Horaud and F. Dornaika, "Hand-Eye Calibration." International Journal of Robotics Research, vol. 14, no. 3, pp. 195-210, 1995

NPL 3: Z. Zhang, "A flexible new technique for camera calibration," IEEE Transactions on Pattern Analysis and Machine Intelligence, vol. 22, no. 11, pp. 1330-1334, 2000

NPL 4: T. Drummond and R. Cipolla, "Real-time visual tracking of complex structures," IEEE Transactions on Pattern Analysis and Machine Intelligence, vol. 24, no. 7, pp. 932-946, 2002

NPL 5: W. Hoff and T. Vincent. "Analysis of head pose accuracy in augmented reality," IEEE Transactions on Visualization and Computer Graphics, vol. 6, no. 4, pp. 319-334, 2000

SUMMARY OF INVENTION

Accordingly, the present invention provides a method for determining the placement of a camera or a range sensor capable of accurately measuring the position and orientation of an object to be measured.

To address the above-described issue, according to the present invention, an information processing apparatus for determining a position and orientation of an image capturing apparatus that captures an image of an object is provided. The apparatus includes a holding unit configured to hold a 3D shape model representing a 3D shape of an object, a generating unit configured to generate candidates of the position and orientation of the image capturing apparatus relative to the object, an evaluating unit configured to evaluate the candidates of the position and orientation of the image capturing apparatus relative to the object on the basis of a result of matching between the virtually generated data of the object with the image capturing apparatus placed in the position and orientation generated by the generating unit and the 3D shape model, and a determining unit configured to determine the position and orientation of the image capturing apparatus relative to the object on the basis of the result of evaluation performed by the evaluating unit.

According to the present invention, the placement of a camera or a range sensor capable of accurately measuring a position and orientation can be determined.

Further features of the present invention will become apparent from the following description of embodiments with reference to the attached drawings.

BRIEF DESCRIPTION OF DRAWINGS

FIG. 1 illustrates the configuration of an information processing apparatus according to a first embodiment.

FIG. 2 illustrates the arrangement of a robot, a camera, and a part according to the first embodiment.

FIG. 3 is a flowchart of the procedure for determining the placement of the camera according to the first embodiment.

FIG. 4 illustrates matching between edges in a grayscale image and a 3D shape model.

FIG. 5 illustrates a method for sampling a position and orientation according to a second embodiment.

FIG. 6 illustrates an example of a GUI according to a third embodiment.

FIG. 7 is a hardware configuration diagram of an information processing apparatus according to the present invention.

FIG. 8 illustrates an example of determination of candidates of the placement of a camera according to the first embodiment.

DESCRIPTION OF EMBODIMENTS

Before describing embodiments of the present invention, the hardware configuration of an information processing apparatus of each of the embodiments is described with reference to FIG. 7.

FIG. 7 is a hardware configuration diagram of an information processing apparatus 1 according to the present embodiment. As illustrated in FIG. 7, a central processing unit (CPU) 710 performs overall control of devices connected thereto via a bus 700. The CPU 710 reads out processing steps and programs stored in a read only memory (ROM) 720 and executes the processing steps and programs. An operating system (OS), processing programs according to the present embodiment, and device drivers are stored in the ROM 720, are temporarily stored in a random access memory (RAM) 730, and are executed by the CPU 710 as needed. In addition, an input interface (I/F) 740 receives, from external apparatuses (e.g., a display unit and a operation unit), an input signal in a format that can be processed by the information processing apparatus 1. In addition, an output interface (I/F) 750 outputs, to an external apparatus (a display unit), an output signal in a format that can be processed by the display unit.

First Embodiment

According to the first embodiment, to measure the position and orientation of an object (e.g., a part that constitutes an industrial product) using model fitting to a grayscale image obtained from a camera, a method for determining the optimum placement from among a plurality of candidates of placement of a plurality of cameras relative to the part is described. According to the present embodiment, a part to be measured is fixed in a scene (e.g., on a workbench). The camera is provided on an arm of a vertical articulated robot (refer to FIG. 2). The method according to the present embodiment is used to, for example, determine the trajectory of the movement of the robot. When parts are assembled, the robot is moved so that the placement of the camera is the same as the placement of the camera determined using the method according to the present embodiment.

FIG. 1 illustrates the configuration of the information processing apparatus 1 according to the present embodiment. The information processing apparatus 1 includes a placement candidate generating unit 10, a model holding unit 20, a placement evaluating unit 30, and a placement determining unit 40. The placement determining unit 40 is connected to a placement information storage unit 50 disposed outside the information processing apparatus 1.

FIG. 2 illustrates the arrangement of a robot, a camera, and a part according to the present embodiment. An arm of the vertical articulated robot has a hand attached to a top end thereof. The hand is used to grasp a part. The vertical articulated robot mounts the part grasped by the hand on another part placed on a workbench. A camera is fixed on the arm of the vertical articulated robot. The camera is used to measure the position and orientation of the part placed on the workbench relative to the robot (the hand). The camera is connected to the information processing apparatus 1. An image captured by the camera is sent to the information processing apparatus 1. The position and orientation of the camera relative to the hand of the vertical articulated robot is calibrated using, for example, a method described in NPL 2 in advance. The position and orientation of the part relative to the hand is transformable into the position and orientation of the part relative to the camera.

In addition, the intrinsic parameters of the camera, such as the focal length, the image center position (the coordinates of an intersecting point of the optical axis and the image plane), and lens distortion parameters, are calibrated using, for example, a method described in NPL 3 in advance. The units that constitute the information processing apparatus 1 are described below.

The placement candidate generating unit 10 generates a plurality of candidates of the placement of camera relative to a part to be measured. As used herein, the phrase "placement of a camera (an image capturing apparatus) relative to a part to be measured" refers to the position and orientation of the camera relative to a part to be measured in a 3D space with six degrees of freedom. According to the present embodiment, the camera is disposed on the arm of the robot, the position and orientation of the camera generated as the candidate is limited to that available within the movable range of the arm. Hereinafter, to avoid confusion, the position and orientation indicating the placement of a part to be measured through model fitting is referred to as "measurement-time position and orientation", and the position and orientation indicating the placement of a camera is referred to as "placement-time position and orientation".

The model holding unit 20 holds the 3D shape model of a part to be measured. According to the present embodiment, the model holding unit 20 holds a polygon model of the part to be measured as the 3D shape model. The polygon model is a model using a polyhedron that approximates the shape of the object. The polygon model is formed from information regarding the vertexes, the edges, and the faces of the polyhedron. The vertex information includes the 3D coordinates of each of the vertices in the 3D coordinate system defined by the model (hereinafter referred to as a "model coordinate system"). The edge information includes a connection relationship among the vertices. The face information includes information regarding the normal of each of the faces. The polygon model may be created on the basis of, for example, design data of the part (CAD data), the image of an actual part, or 3D measurement data (a 3D point cloud). According to the present embodiment, to measure the position and orientation using model fitting, each of the edges that constitute the polyhedron is fitted to one of the edges detected on the image. This method is described in, for example, NPL 4. The placement evaluating unit 30 calculates an index indicating the appropriation level of placement for each of the candidates of the placement-time position and orientation generated by the placement candidate generating unit 10. The appropriation level of placement represents the index indicating the accuracy of the measurement-time position and orientation that is obtained by taking into account both the error in the measurement data and the error in matching. The index indicating the appropriation level of placement is calculated on the basis of the uncertainty of the measurement-time position and orientation caused by noise in the measurement data and the position and orientation actually derived from the model fitting. The initial values used in the model fitting are generated so as to be within a predetermined range at the center of which there is the placement-time position and orientation.

The placement determining unit 40 selects (determines), from among the candidates of placement, the placement having the highest appropriation level on the basis of the indices indicating the appropriation levels of the candidates of placement calculated by the placement determining unit 40. Thereafter, the placement determining unit 40 outputs the selected candidate of placement to the placement information storage unit 50. During actual assembling, the robot is controlled so that the camera is positioned as defined in the placement stored in the placement information storage unit 50. Thereafter, the position and orientation of the part is measured on the basis of the image captured by the camera in the placement.

These functional units are formed by the CPU 710 that loads the programs stored in the ROM 720 into the RAM 730 and performs processing in accordance with the flowcharts described below. In addition, for example, when hardware that replaces the software processing using the CPU 710 is configured, the hardware can be arithmetic units and circuits each corresponding to the processing performed by one of the functional units.

The procedure for determining the placement that allows the position and orientation of the part to be highly accurately measured is described below. FIG. 3 is a flowchart of the procedure for determining the placement of the camera according to the present embodiment.

Step S1005

In step S1005, the placement evaluating unit 30 reads in, from the model holding unit 20, the 3D shape model for the part to be measured. As described above, according to the present embodiment, the polygon model of the part to be measured is held as the 3D shape model of the part.

Step S1010

In step S1010, the placement evaluating unit 30 generates N candidates of the placement of the camera. As described above, the placement of the camera is rep-resented by the position and orientation in six degrees of freedom. In addition, since it is assumed that the camera is mounted on the arm of the robot, the placement-time position and orientation is generated so as to be within the range of the position and orientation that is available within the moving range of the arm. A candidate of the placement of the camera is determined as follows. That is, let us consider a sphere with a radius of R at the center of which there is the center of gravity of the part first. Then, the sphere is approximated by a polyhedron (e.g., a pentakis icosidodecahedron). The radius R is an observation distance from the camera to the part. For example, the radius R is set to the distance between the lens center of the camera and the point of focus. As illustrated in FIG. 8, by setting the position and orientation of the part so that the lens center of one of the cameras is located at each of the vertices of the polyhedron and the optical axis of the camera is directed toward the center of the sphere, a plurality of the position and orientation values equal in number to the number of vertices can be obtained (80 in the case of a pentakis icosidodecahedron). Each obtained position and orientation of the camera is transformed into the position and orientation of the hand using the above-described positional relationship between the hand and the camera. If the transformed position and orientation is not within the moving range of the arm, the position and orientation is removed from the candidates.

Step S1020

In step S1020, the placement evaluating unit 30 performs an initialization process. More specifically, the placement evaluating unit 30 sets "i" representing a placement candidate number to 1.

Step S1030

In step S1030, the placement evaluating unit 30 calculates the uncertainty $U_i$ of the measurement-time position and orientation caused by an error in the measurement data when measurement is performed in a placement-time position and orientation corresponding to the i-th candidate of placement. According to the present embodiment, since the measurement data is an edge on the grayscale image, the uncertainty of the measurement-time position and orientation is calculated on the basis of the edge detection error. To calculate the uncertainty of the position and orientation on the basis of the measurement data (the edge detection error), the method described in NPL 5 is employed. In this method, it is assumed that a relationship between the measurement data and the position and orientation is linear, and the covariance matrix of the error in the measurement data is transformed into the covariance matrix of the error in the position and orientation. According to the present embodiment, since the position and orientation is calculated using edges, the covariance matrix of the edge detection error is needed. For example, the covariance matrix of the edge detection error is considered to be a matrix having nondiagonal elements of zero and diagonal elements of common variance values under the assumption that the detection errors of the edges are independent from one another. For example, the common variance value is obtained by detecting the edges from a plurality of images captured by the camera with the part to be measured fixed in front of the camera and calculating the average of the variances of the edge detection positions at the same location. The covariance matrix representing the uncertainty of a position and orientation is a 6×6 matrix. It is difficult to compare a covariance matrix with another covariance matrix directly. Accordingly, among the vertices included in the 3D shape model of the part, a variation of a point $P_f$ that is the farthest from the origin of the model coordinate system is used as the index of the uncertainty. The 3D coordinates of the point $P_f$ in the model coordinate system are expressed as: $X_f=(X_f, Y_f, Z_f)$. The camera coordinates of the point $P_f$ are expressed as: $X_c=(X_c, Y_c, Z_c)$. $X_c$ can be obtained by transforming $X_f$ using the position and orientation of the camera. Let $t_i$ be the 3D vector representing the position of the camera relative to the part, and let $R_i$ be a 3×3 rotation matrix representing the orientation. Then, the coordinate transformation from $X_f$ to $X_c$ can be expressed as follows:

$$X_c = R_i X_f + t_i \qquad \text{(Eq. 1).}$$

The degree of freedom of the 3×3 rotation matrix indicating the orientation is 3. Let $\omega_i$ be the parameter indicating the orientation in three degrees of freedom. Let $s_i$ be the parameter indicating the placement-time position and orientation of the camera corresponding to the i-th candidate of placement in six degrees of freedom. Then, $s_i$ is formed from a parameter $t_i$ indicating the position in three degrees of freedom and the parameter $\omega_i$ indicating the orientation in three degrees of freedom. Let J be the Jacobian matrix for the position and orientation of the camera coordinates $X_c$.

Then, the relationship between a small change $\Delta s_i$ in the position and orientation $s_i$ and a small change in the camera coordinates $X_c$ is approximated as follows:

[Math. 1]

$$\Delta X_c \approx J \Delta s_i \quad \text{(Eq. 2)}.$$

Let $C_{cam}$ be the 6×6 covariance matrix of the position and orientation of the camera. Then, the 3×3 covariance matrix $C_f$ of $X_c$ can be calculated using Eq. 2 as follows:

$$C_f = J C_{cam} J^T \quad \text{(Eq. 3)}.$$

$\sigma_{max}$, a root of the maximal eigenvalue of the covariance matrix $C_f$ is used as the index of the uncertainty of the variation of the point $P_f$. $\sigma_{max}$ corresponds to the standard deviation in a direction in which the position of the point $P_f$ maximally varies. The index $\sigma_{max}$ of the uncertainty of the farthest point $P_f$ obtained in the above-described manner is defined as an index $U_i$ of the uncertainty of the measurement-time position and orientation for a placement-time position and orientation corresponding to the i-th candidate of placement.

Step S1040

In step S1040, the placement evaluating unit 30 calculates the position and orientation actually obtained through model fitting. The initial values for model fitting are generated so as to be within a certain range at the center of which there is the placement-time position and orientation $s_i$ corresponding to the i-th candidate of placement. Note that at that time, in model fitting, edges are not detected from an actual image. Instead, the position of a line segment in the image is calculated using the placement-time position and orientation $s_i$ and the calibrated camera intrinsic parameters. That is, image data to be obtained when the object is observed from the placement-time position and orientation is virtually rendered using the 3D shape model.

In this step, the positions and orientations are sampled in the vicinity of the placement-time position and orientation $s_i$ first. The sampling range is determined by taking into account the actual usage scene. For example, the range in which the position and orientation is sampled is determined on the basis of, for example, the accuracy of position and orientation control performed on the camera (the robot) and the accuracy of placement when the part is placed on the workbench. According to the present embodiment, sampling is performed so that the component of position in each of three degrees of freedom is in the range of ±δ [mm] and the rotational component about the optical axis of the orientation in three degrees of freedom is in the range of ±θ [degrees]. Note that the sampling may be random sampling or uniform sampling. Also note that the number of the sampled position and orientation values is M.

Next, let $h_j$ be the position and orientation of each of the M samples randomly obtained in the above-described range (j=1, 2 ..., M). The position and orientation is calculated first using the method described in NPL 4 and $h_j$ (j=1, 2 ..., M) as the initial value of the position and orientation. In the method described in NPL 4, edges are detected from the captured image. In contrast, according to the present embodiment, edges are not detected from the image. Instead, the position of each of line segments that constitute the 3D shape model in the image is calculated using the position and orientation $s_i$ and the calibrated camera intrinsic parameters. To perform matching, an edge that is the closest to the model is searched for using the result of calculation of the positions of the line segments in the image.

Let $h'_j$ (j=1, 2 ..., M) be the measurement-time position and orientation calculated using $h_j$ (j=1, 2 ..., M) as the initial value of the position and orientation. Then, if the probability of a given position and orientation $s$ being measured follows the normal distribution, the probability can be calculated using the covariance matrix $C_{cam}$ of the position and orientation obtained in step S1030 as follows:

[Math. 2]

$$p(s) = \frac{1}{\left(\sqrt{2\pi}\right)^6 \sqrt{|C_{cam}|}} \exp\left(-\frac{1}{2}(s-s_i)^T C_{cam}^{-1}(s-s_i)\right). \quad \text{(Eq. 4)}$$

At that time, if the probability of $h'_j$ being obtained is lower than a threshold value (e.g., 0.9), it is determined that $h'_j$ is a solution having an error caused by a factor other than the variation of the measurement data (hereinafter referred to as a "local solution"), and the number $L_i$ of $h'_j$ that are determined to be local solutions is counted. $h'_j$ that is determined to be a local solution is expressed as $h''_k$ (k=1, 2, ..., $L_i$).

Step S1050

In step S1050, the placement evaluating unit 30 calculates an index $A_i$ representing the appropriation level of $s_i$ using the index $U_i$ of the uncertainty of the placement-time positions and orientations $s_i$ obtained in steps S1030 and information regarding the local solution obtained in S1040. Since the metric space of $U_i$ differs from the metric space of $L_i$, $U_i$ and $L_i$ should be expressed in the same metric space. In the present embodiment, the following index $A_i$ in Eq. 5 is used:

[Math. 3]

$$A_i = \frac{1}{1 + U_i + \sum_{k=1}^{L_i} |||X_c(h''_k) - X_c(s_i)|||}. \quad \text{(Eq. 5)}$$

In Eq. 5, $X_c(h''_k)$ and $X_c(s_i)$ represent the camera coordinates of the point $P_f$ transformed using $h''_k$ and $s_i$, respectively. Since the second term and the third term of the denominator of the index $A_i$ are expressed as lengths in the 3D space, the index $A_i$ is made to be an index in the same metric space. In addition, the index $A_i$ is an index that increases with decreasing number of the local solutions and decreasing difference between the local solution and $S_i$. The appropriation level increases with increasing index $A_i$.

Step S1060

In step S1060, the placement evaluating unit 30 determines whether the index $A_i$ representing the appropriation level has been calculated for all the candidates of placement. If the index $A_i$ has been calculated for all the candidates of placement, the processing proceeds to step S1080. Otherwise, the processing proceeds to step S1070.

Step S1070

In step S1070, the placement evaluating unit 30 increments i by one.

Step S1080

In step S1080, the placement determining unit 40 selects the optimal placement for accurately measuring the position and orientation of the part on the basis of the index $A_i$ representing the appropriation level calculated in step S1050. According to the present embodiment, the placement-time position and orientation $s_{best}$ in which the index $A_i$ is maximized is selected. The selected placement-time position and orientation is stored in the placement information storage unit 50. When actual measurement of the position and orientation is performed, the robot is moved so that the placement-time position and orientation of the camera relative to the part is the same as the placement-time position and orientation $s_{best}$.

As described above, according to the first embodiment, the appropriation level of the placement is calculated on the basis of the uncertainty of the position and orientation measured for each of the candidates of the camera placement relative to the part and the information regarding the local solution obtained when model fitting is actually applied. Thus, the best placement is selected.

By employing the method according to the first embodiment, the best placement of the camera relative to the part can be determined by taking into account both the uncertainty of the measurement-time position and orientation caused by an error in the measurement data and an error in the measurement-time position and orientation caused by an error in matching of the measurement data.

Modifications

In step S1080 according to the first embodiment, the placement determining unit 40 selects the best placement for highly accurately measuring the position and orientation of the part on the basis of the index $A_i$ representing the appropriation level calculated in step S1050. However, according to the first embodiment, a new placement for measuring the position and the orientation may be generated on the basis of the index $A_i$ representing the appropriation level. For example, the placement-time position and orientation in which the index $A_i$ is maximized and the placement-time position and orientation having a second highest index may be selected, and a new position and orientation may be generated between the two. In addition, at that time, the new position and orientation may be generated in the middle between the two or may be generated by assigning a weight in accordance with the value of the index.

Second Embodiment

In the first embodiment, the position and orientation values are sampled in the vicinity of a candidate of the placement-time position and orientation of the camera. Thereafter, actual model fitting is performed using the sampled position and orientation as the initial value to determine whether a local solution exists. In contrast, according to the second embodiment, a method for determining whether a local solution exists using only calculation of the value of an evaluation function without performing model fitting is described.

Since the configuration of an information processing apparatus according to the second embodiment is the same as that of the first embodiment, description of the configuration of the information processing apparatus is not repeated. In addition, since the procedure for determining the placement of the camera according to the second embodiment is substantially the same as that of the first embodiment, description of the drawings and the same part of the procedure is not repeated. A process corresponding to the process in step S1040 is described below as the process in step S2040.

Step S2040

In step S2040, the placement evaluating unit 30 determines whether a local solution of model fitting in the vicinity of the placement-time position and orientation $s_i$ corresponding to the i-th candidate of placement exists.

As in step S1040 of the first embodiment, a plurality of the position and orientation values are sampled in the vicinity of the placement-time position and orientation $s_i$. However, unlike step S1040, the position and orientation is not calculated using model fitting. In this step, it is determined whether a local solution exists on the basis of the value of an evaluation function in each sampled position and orientation. As used herein, the term "evaluation function" refers to a function which is a target of minimization when the position and orientation is calculated using model fitting. Unlike random sampling of the first embodiment, according to the present embodiment, the space of the position and orientation is sampled densely at equal intervals. The sampling range is determined in the same manner as in the first embodiment. According to the present embodiment, sampling is not performed for all the six degrees of freedom, but the two-degrees of freedom space of the X coordinate and Y coordinate of a position in the camera coordinate system is sampled. Let S denote the number of X coordinates and the number of Y coordinates. Then, the number of the sampled position and orientation values is $S^2$. Let $h_j$ (j=1, 2 . . . , $S^2$) be each of $S^2$ sampled position and orientation values. Then, the evaluation function for optimizing the position and orientation for each $h_j$ in model fitting is calculated.

Subsequently, the position of each of the line segments that constitute the 3D shape model is calculated using the placement-time position and orientation $s_i$ and the calibrated camera intrinsic parameters. Thereafter, the edge position in the image when the position and orientation is the placement-time position and orientation $s_i$ is calculated.

Subsequently, the evaluation function for the sampled position and orientation $h_j$ (j=1, 2 . . . , $S^2$) in model fitting is calculated. According to the method described in NPL 4, a line segment of the 3D shape model is projected onto the image using the initial value of the position and orientation and the camera intrinsic parameters. Thereafter, as illustrated in FIG. 4, dividing points are set on the projected line segment so as to be located at equal intervals in the image. An edge that is in close proximity on the normal direction of the projected line segment is searched for each of the dividing points, and the line segment is matched to the edge. Thereafter, the sum of squares of the distance between the matched edge and the 3D shape model (the line segment) is used as the evaluation function (the error function). The evaluation function of each of the sampled position and orientation $h_j$ is calculated as follows. That is, the coordinates of both the end points of each of the line segments of the 3D shape model in the image are calculated first using the sampled position and orientation h and the camera intrinsic parameters. The coordinates are regarded as the line segment in the image. Thereafter, dividing points are set on the calculated line segment in the image at equal intervals (every T pixels), and an edge that is the closest to the dividing point in the normal direction of the line segment is searched for each of the dividing points on the basis of the above-described result of edge position calculation. Let ($u_s$, $v_s$) denote the position of the dividing point set in the image. Let ($u'_s$, $v'_s$) denote the position of the corresponding edge. Let ($n_{xs}$, $n_{ys}$) denote the normal vector of the line segment in the image obtained by projecting the line segment of the model. Let $N_d$ denote the number of the dividing points obtained from all the line segments projected onto the image. Then, the evaluation function $E_j$ is given as follows:

[Math. 4]

$$E_j = \frac{1}{2}\sum_{s=1}^{N_d}\left(\frac{n_{xs}(u_s - u'_s) + n_{ys}(v_s - v''_s)}{\sqrt{n_{xs}^2 + n_{ys}^2}}\right)^2. \quad \text{(Eq. 6)}$$

After the evaluation value is calculated using the evaluation function in Eq. 6 for each sampled position and orientation $h_j$, it is determined whether a position and orientation in which the evaluation value is minimized exists. As illustrated in FIG. 5, according to the present embodiment, since the two degrees of freedom space of X coordinate and Y coordinate in the camera coordinate system is sampled at equal intervals, it is determined whether the local solution $h_j$ that minimizes the evaluation value for all the sampled positions that neighbor each other in the X direction and the Y direction. $h_j$ that is determined to be a local solution is expressed as $h''_k$ (k=1, 2 ..., $L_i$), where $L_i$ represents the number of local solutions.

Since the subsequent procedure for determining the placement of the camera is the same as that of the above-described embodiment, description of the procedure is not repeated.

As described above, according to the second embodiment, to obtain the information regarding the local solution obtained when model fitting is performed, actual model fitting is not performed, and it is determined whether a local solution exists using the evaluation value for a sampled position and orientation obtained through only calculation of the value of the evaluation function.

By using the method according to the second embodiment, a position and orientation that is likely to be a local solution can be obtained in advance. By avoiding such a position and orientation, the placement that allows accurate measurement of the position and orientation can be provided. In addition, according to the second embodiment, evaluation is performed for each of the position and orientation values that are densely sampled. Accordingly, the best placement can be determined by taking into account the possibility that a solution that is not foreseen when the placement is determined can be obtained in an actual use scene.

Third Embodiment

According to a third embodiment, a method for a user to use, through a graphical user interface (hereinafter simply referred to as a "GUI"), the method for determining the placement of the camera relative to a part according to the first or second embodiment is described.

FIG. 6 illustrates an example of a GUI according to the present embodiment. A GUI 3000 includes a model read-in button 3100, a camera parameter read-in button 3200, an observation distance setting slider 3300, a calculation button 3400, a placement apply button 3500, a previous candidate button 3600, a next candidate button 3700, an evaluation value presentation section 3800, and a model display section 3900.

A user reads in the 3D shape model of a part to be measured using model read-in button 3100 first. When the model read-in button 3100 is pressed, a file selection dialog, for example, is displayed. The user selects the file of a desired 3D shape model. As described in the first embodiment, the 3D shape model is a polygon model, for example.

Subsequently, the user reads in the camera intrinsic parameters used to measure the position and orientation using the camera parameter read-in button 3200. If the camera parameter read-in button 3200 is pressed, a file selection dialog, for example, is displayed. The user selects a file of a desired intrinsic parameter. As described in the first embodiment, the camera intrinsic parameters are calibrated in advance, and a file to be read in contains the calibrated intrinsic parameter. Note that the process to read in the camera intrinsic parameters may be performed prior to the process to read in the 3D shape model.

Subsequently, the user inputs the distance from the camera to the part when an image for measuring the position and orientation is captured using the observation distance setting slider 3300. One end of the slider indicates the smallest value of the settable observation distance, and the other end of the slider indicates the largest value of the observation distance. The smallest value and the largest value may be input by the user using a GUI. Alternatively, the smallest value and the largest value may be written in the above-described file of the intrinsic parameter in advance. The set observation distance is used as the radius R of the sphere when the candidates of the placement of the camera are generated in step S1010 of the first embodiment.

After the read-in of the 3D shape model and the camera intrinsic parameters and the setting of the observation distance are completed, the user presses the calculation button 3400. Thus, a plurality of candidates of the placement of the camera are generated, and the index representing the appropriation level of each of the candidates of placement is calculated. Thereafter, the user selects the optimal placement from among the candidates. The index representing the appropriation level of the optimal placement is presented in the evaluation value presentation section 3800 in the form of a value. At the same time, the appearance of the part obtained when the image of the part is captured by the camera in the selected placement is presented in the model display section 3900. The appearance of the part presented in the model display section 3900 is generated by rendering the 3D shape model as a computer graphics (CG) image using, for example, the selected position and orientation of the camera relative to the part in the selected placement and the camera intrinsic parameters. The rendering of the 3D shape model is performed using a graphics library, such as OpenGL. Note that for example, the appearance in the position and orientation serving as a local solution may be rendered using, for example, a wire frame model and may be displayed in a superimposed manner so that the user can find out how much offset possibly occurs. Alternatively, instead of specifying the whole part, the user may specify a portion of the part to find out how much offset of the portion possibly occurs. Note that when the appearance of the part is rendered, the 3D shape model used for measuring the position and orientation need not be directly used. Another model that is viewable by the user when rendered can be used. For example, the polygon model having a rough shape may be used.

In addition, the farthest point $P_f$ may be presented at the same time. Furthermore, the information regarding a variation of the position and orientation of the camera caused by the edge detection error may be presented.

In addition, the user can have the information regarding a candidate of placement having the next highest appropriation level presented thereto using the next candidate button 3700. By using the function, the user can choose another option by viewing the information regarding the option if for example, it is difficult to achieve the placement that is determined to be optimum due to a physical reason. By using the previous candidate button 3600, the user can go back to select the placement having a higher appropriation level.

If the user finally selects the placement to be used, the user presses the placement apply button 3500. In this manner, the placement is applied. The selected placement is stored in the placement information storage unit 50.

As described above, according to the third embodiment, the user can view the appropriation level of the placement and select a more appropriate placement based on the user's decision by using the GUI.

Modification 1

In the above-described embodiments, the position and orientation of a part is measured using model fitting for the edges detected in a grayscale image obtained by a camera. However, the method for measuring the position and orientation of a part is not limited thereto. For example, the feature points detected in the grayscale image may be used. Alternatively, the luminance value of each of the pixels of the grayscale image may be used.

Alternatively, the position and orientation may be measured by fitting the 3D shape model of the part to a 3D point cloud measured by a range sensor. Examples of the range sensor include a passive sensor formed from a plurality of cameras (stereo cameras) and an active sensor formed from one or more cameras and a projector. Still alternatively, the range sensor may be a sensor that performs Time-of-Flight measurement. In such a case, the range sensor is mounted on the robot arm instead of the camera and determines the placement of the range sensor relative to the part.

In addition, as in the method described in PTL 1, the position and orientation may be measured by fitting the 3D shape model to both the image feature of the grayscale image and the 3D point cloud measured by the range sensor. In such a case, the image capturing apparatus may be an apparatus formed from a rigid combination of a camera for capturing a grayscale image and the range sensor or an apparatus that allows the camera of a range sensor formed from the above-described camera and projector to be used for capturing the grayscale image.

Modification 2

In the above-described embodiments, it is assumed that the detection errors of the edges are independent from one another and have a common variance value and, thus, the covariance matrix of an edge detection error is given. However, the covariance matrix of an edge detection error is not limited thereto. For example, a plurality of images at the position and orientation of each of the candidates may be generated on the basis of information regarding a 3D shape model having a reflection property and a light source, the camera intrinsic parameters, and the noise parameter of the camera. Thereafter, the variance of the positions of the edge detected from the generated images may be calculated. Alternatively, the variation of the luminance value may be transformed into the variation of the edge position on the basis of a method for calculating the edge position from the luminance values in the vicinity of the edge. Note that to obtain the noise parameter of a camera, a variance of the luminance value of each of the pixels when for example, the image of the same scene is captured a plurality of times is obtained. The median value of the variance is used as the noise parameter. Alternatively, the placement of the camera and the part that is similar to each of the candidates is generated by actually controlling the robot arm, and the image of the placement is captured to obtain a plurality of the images. Thereafter, the variance of the edge position may be obtained from the result of edge detection in the plurality of images.

Modification 3

In the above-described embodiments, a variation of the point $P_f$ that is the farthest from the origin of the model coordinate system is used as the index representing the uncertainty of the measurement-time position and orientation. However, the index representing the uncertainty of the measurement-time position and orientation is not limited thereto. Another index can be used. For example, instead of the variation of the point that is the farthest from the origin of the model coordinate system, a variation of the point that provides the median value of the distance from the origin of the model coordinate system may be used. Note that the variation of the point is not necessarily the root of the maximal eigenvalue of the covariance matrix of the positions of points, but may be the sum of the eigenvalues of the covariance matrices of the positions of points. Alternatively, the index may be an index based on the eigenvalue of the covariance matrix of the position and orientation. For example, the index may be the maximal eigenvalue of the covariance matrix of the position and orientation or the sum of the eigenvalues.

Modification 4

In the above-described embodiments, the index given by Eq. 5 is used as the index representing the appropriation level of the placement-time position and orientation. However, the index representing the appropriation level of the placement-time position and orientation is not limited thereto. For example, the weights of the second and third terms of the denominator in Eq. 5 may be changed. If the weight of the second term is increased, the index that prioritizes the variation when a local solution is avoided can be obtained. In contrast, if the weight of the third term is increased, the placement that maximally avoids a local solution is evaluated as a more appropriate placement.

Modification 5

In the above-described embodiments, in model fitting, the edge position in an image is obtained by calculation. However, the edge position always need not be obtained by calculation. For example, by actually controlling the robot arm so that the placement of the camera and the part is similar to each of the candidates of placement, the image of placement may be captured to obtain a plurality of images. Thereafter, edge detection is performed for each of the images, and model fitting may be performed. Alternatively, a plurality of images in the position and orientation of each of the candidates may be generated on the basis of information regarding a 3D shape model having a reflection property and a light source, the camera intrinsic parameters, and the noise parameter of the camera. Thereafter, edge detection may be performed using the generated images and model fitting may be performed.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Definition

A position and orientation candidate generating unit may be any unit that generates a candidate of the placement of a camera relative to a part to be measured. For example, as described in the first embodiment, a sphere with a radius of R at the center of which there is the center of gravity of the part may be approximated by a polyhedron. The lens center of a camera may be placed at each of the vertices of the polyhedron. The optical axis of each of the cameras may be directed toward the center of the sphere. In this manner, a candidate of the placement may be generated. Alternatively, points may be disposed on and inside a regular hexahedron at the center of which there is the center of gravity of the part. Thereafter, a candidate of the placement may be generated by placing the lens center of a camera at each of the points.

In addition, when the camera is mounted on the arm of the robot, each obtained position and orientation of the camera may be transformed into the position and orientation of the robot hand. If the transformed position and orientation is not within the moving range of the arm, the position and orientation may be removed from the candidates.

In addition, in the above-described first embodiment, to sample a position and orientation in the vicinity of the position and orientation of a candidate, sampling is performed within the range of three degrees of freedom for the position and within the range of one degree of freedom for the orientation. However, the degrees of freedom of sampling are not limited thereto. For example, sampling may be performed for all the six degrees of freedom by performing sampling within the range of three degrees of freedom for the position and within the range of three degrees of freedom for the orientation.

In addition, in the above-described second embodiment, like the first embodiment, sampling is performed in a two degree-of-freedom space of X coordinate and Y coordinate. However, the degrees of freedom of sampling are not limited thereto. For example, in addition to X coordinate and Y coordinate of a position, sampling may be performed for rotation about the optical axis of the camera.

In addition, in the above-described embodiments, the camera is fixed to the arm of the robot and captures the image for measuring the position and orientation of the part fixed in the scene relative to the hand. However, the placement of the camera is not limited thereto. For example, the camera may be fixed in the scene, and the placement for accurately measuring the part grasped by the hand of the robot may be determined. Alternatively, the camera may be fixed to a robot other than the robot grasping the part, and placement of the part grasped by the robot and the camera on the robot may be determined.

A position and orientation evaluating unit may be any unit that evaluates the placement of the camera relative to the part to be measured. For example, as described in the first embodiment, a plurality of position and orientation values may be sampled in the vicinity of the placement-time position and orientation. Thereafter, the camera placement may be evaluated on the basis of the position and orientation obtained when the model fitting is performed using the sampled position and orientation as the initial value. Furthermore, as described in the second embodiment, a plurality of position and orientation values may be densely sampled in the vicinity of the placement-time position and orientation. Thereafter, it may be determined whether a local solution exists from the value of the evaluation function to be minimized in model fitting for each sampled position and orientation. In this manner the camera placement may be evaluated.

The placement determining unit may employ any technique that can select an optimum placement from among a plurality of placements of the camera relative to the part to be measured. As described in the first embodiment, the placement that maximizes the appropriation level may be selected. Alternatively, as described in the third embodiment, a list of the placements with an appropriation level, sorted from the highest, is presented to the user, and the user may select one of the placements.

The model holding unit may be any unit that can hold the 3D shape model of a part to be measured which is read in from a storage unit. For example, the model holding unit is formed as a RAM of a computer. In addition, in the above-described embodiments, a polygon model that uses a polyhedron to approximate the part and that serves as the 3D shape model of the part is employed. However, the 3D shape model is not limited thereto. Any model that allows model fitting to be applied to a grayscale image or a range image can be used. For example, the model may be data of a set of points obtained by sampling, in advance, points of the polygon model used for model fitting. Note that the data of a set of points are not limited to those obtained by sampling on the polygon model. The data may be obtained by measuring the actual part. In addition, the model need not be a model that allows a part to be approximated by a polyhedron. The model may be CAD data, such as a STEP format file, which describes the exact physical shape.

Summary of Effects

According to the present invention, by using an index generated by taking into account an error in the measurement-time position and orientation caused by an error in matching of the measurement data in addition to the uncertainty of the measurement-time position and orientation caused by an error in the measurement data, the placement of the camera relative to the part to be measured can be more appropriately determined.

In addition, by combining the above-described index and GUI, the user can view the appropriation level of the placement. Furthermore, the user can select a more appropriate placement on the basis of their decision.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2014-242439, filed Nov. 28, 2014 and No. 2015-179096, filed Sep. 11, 2015, which are hereby incorporated by reference herein in their entirety.

The invention claimed is:

1. An information processing apparatus for determining a position and orientation of an image capturing apparatus that captures an image of an object, comprising:
   one or more processors; and
   one or more memory devices, the one or more memory devices storing a 3D shape model representing a 3D shape of the object, the one or more memory devices storing executable instructions, which when executed by the one or more processors, cause the information processing apparatus to perform operations comprising:

generating candidates of the position and orientation of the image capturing apparatus relative to the object;

evaluating the candidates of the position and orientation of the image capturing apparatus relative to the object on the basis of a result of matching between virtually generated data of the object with the image capturing apparatus placed in the position and orientation generated by the generating and the 3D shape model;

deriving the position and orientation of the object from the result of matching, wherein the evaluating evaluates the candidates of the position and orientation of the image capturing apparatus relative to the object by evaluating the derived position and orientation, wherein the deriving derives a plurality of positions and orientations of the object by generating, in the vicinity of the position and orientation generated by the generating, a plurality of positions and orientations that differ from the position and orientation and matching a feature in the virtually generated data of the object observed from the originally generated position and orientation with a feature of the 3D shape model placed at each position and orientation generated in the vicinity of the position and orientation; and determining the position and orientation of the image capturing apparatus relative to the object on the basis of the result of evaluation performed by the evaluating.

2. The information processing apparatus according to claim 1, wherein the deriving derives the position and orientation of the object by matching a feature in the virtually generated data of the object with the image capturing apparatus placed in the position and orientation generated by the generating with a feature in the 3D shape model.

3. The information processing apparatus according to claim 1, wherein the evaluating includes calculating a probability of the derived position and orientation being obtained and evaluating the derived position and orientation on the basis of the probability.

4. The information processing apparatus according to claim 3, wherein the information processing apparatus calculates the number of the position and orientation values having the probability that is lower than a threshold value for each of the plurality of position and orientation values and determines the position and orientation of the image capturing apparatus relative to the object on the basis of the number.

5. The information processing apparatus according to claim 1, wherein the evaluating evaluates the candidates of the position and orientation of the image capturing apparatus relative to the object on the basis of an error function obtained from the result of matching.

6. The information processing apparatus according to claim 1, wherein the generating generates a plurality of candidates of the position and orientation, the evaluating evaluates a position and orientation derived from each of the position and orientation, and the determining determines the position and orientation of the image capturing apparatus relative to the object by selecting one of the position and orientation from among the candidates of the position and orientation on the basis of the result of evaluation performed by the evaluating.

7. The information processing apparatus according to claim 1, wherein the generating generates a plurality of candidates of the position and orientation, the evaluating evaluates the position and orientation derived from each of the candidates of the position and orientation, and the determining determines the position and orientation of the image capturing apparatus relative to the object by generating a new position and orientation on the basis of the candidates of the position and orientation and the result of evaluation performed by the evaluating.

8. The information processing apparatus according to claim 1, wherein the image capturing apparatus is a camera that captures a grayscale image.

9. The information processing apparatus according to claim 1, wherein the image capturing apparatus is a sensor that acquires one of a range image or a 3D point cloud.

10. The information processing apparatus according to claim 1, the operations further comprising:
presenting the determined position and orientation to a user.

11. An information processing method for determining a position and orientation of an image capturing apparatus that captures an image of an object, comprising:
generating candidates of the position and orientation of the image capturing apparatus relative to the object;
evaluating the candidates of the position and orientation of the image capturing apparatus relative to the object on the basis of a result of matching between virtually generated data of the object with the image capturing apparatus placed in the generated position and orientation and a 3D shape model representing a 3D shape of the object;
deriving the position and orientation of the object from the result of matching,
wherein the evaluating evaluates the candidates of the position and orientation of the image capturing apparatus relative to the object by evaluating the derived position and orientation,
wherein the deriving derives a plurality of positions and orientations of the object by generating, in the vicinity of the position and orientation generated by the generating, a plurality of positions and orientations that differ from the position and orientation and matching a feature in the virtually generated data of the object observed from the originally generated position and orientation with a feature of the 3D shape model placed at each position and orientation generated in the vicinity of the position and orientation; and
determining the position and orientation of the image capturing apparatus relative to the object on the basis of the obtained result of evaluation.

12. A non-transitory computer-readable storage medium storing therein a program for determining a position and orientation of an image capturing apparatus that captures an image of an object, the program including executable instructions, which when executed by one or more processors of an information processing apparatus, cause the information processing apparatus to perform operations comprising:
generating candidates of the position and orientation of the image capturing apparatus relative to the object;
evaluating the candidates of the position and orientation of the image capturing apparatus relative to the object on the basis of a result of matching between virtually generated data of the object with the image capturing apparatus placed in the position and orientation generated by the generating and a 3D shape model representing a 3D shape of the object;

deriving the position and orientation of the object from the result of matching, wherein the evaluating evaluates the candidates of the position and orientation of the image capturing apparatus relative to the object by evaluating the derived position and orientation, wherein the deriving derives a plurality of positions and orientations of the object by generating, in the vicinity of the position and orientation generated by the generating, a plurality of positions and orientations that differ from the position and orientation and matching a feature in the virtually generated data of the object observed from the originally generated position and orientation with a feature of the 3D shape model placed at each position and orientation generated in the vicinity of the position and orientation; and determining the position and orientation of the image capturing apparatus relative to the object on the basis of the result of evaluation performed by the evaluating.

13. An information processing apparatus for determining a position and orientation of an image capturing apparatus that captures an image of an object, comprising:

one or more processors; and one or more memory devices, the one or more memory devices storing a 3D shape model representing a 3D shape of the object, the one or more memory devices storing executable instructions, which when executed by the one or more processors, cause the information processing apparatus to perform operations comprising:

generating a plurality of candidates of the position and orientation of the image capturing apparatus relative to the object;

evaluating each of the candidates of the position and orientation of the image capturing apparatus relative to the object by deriving a plurality of positions and orientations of the image capturing apparatus relative to the object in the vicinity of the position and orientation generated by the generating and calculating a value of evaluation function based on the derived plurality of positions and orientations; and determining the position and orientation of the image capturing apparatus relative to the object on the basis of the result of evaluation performed by the evaluating.

* * * * *